Patented Oct. 15, 1940

2,218,336

UNITED STATES PATENT OFFICE 2,218,336

ART OF PRODUCING YEAST

Vaman R. Kokatnur, New York, N. Y., assignor to Autoxygen Inc., New York, N. Y., a corporation of New York No Drawing. Application December 9, 1936, Serial No. 114,921. Renewed April 9, 1940

4 Claims. (Cl. 195—79)

My present invention is concerned with the production of yeast, particularly baker's yeast.

As compared to standard yeast producing processes my present process assures the production of yeast of better quality, of greater resistance, and viability and in larger yield.

Another object is to provide a process involving the propagation of yeast in a catalytic nutrient solution and in which the catalytic agent enables the seed material to assimilate far greater nourishment in a shorter space of time than has heretofore been possible.

Another object of the invention is to produce yeast having a greater nitrogen content than prior types of yeast and which, as will be further explained, has certain definite acquired characteristics which may be transmitted to succeeding generations.

Another object of the invention is to provide a process involving the use of no special equipment, no highly involved technique, and which may be carried out with standard apparatus; which is relatively inexpensive to perform despite the fact that a substantially greater yield (approximately 25% to 50%) is obtained.

In order to understand fully the nature of the invention and its advantages it is believed necessary to review briefly (for the benefit of those skilled in the art) certain facts concerning the general nature and peculiarities of the yeast of the prior art and the commonly practiced methods of producing it.

There are different species of yeast and each species of yeast performs a slightly different function, on the order of the division of labor in human society. Thus some yeast are especially adapted to perform the function of fermenting the soluble sugars, and indirectly the starchy and carbohydrate materials, to produce what is known as grain or ethyl alcohol. Other species ferment sugars to other alcohols like propyl, butyl and amyl alcohols instead of ethyl alcohols. Others are especially adapted to ferment sugars to produce poly-hydroxy compounds like glycerine, gluconic acid, etc. Others produce ketonic compounds such as acetone. Others produce special types of beers. There are, however, other species of yeasts whose primary function seems to be not fermentation, but fattening themselves to produce nitrogenous food. Certain other species, while performing the above function, produce also certain vitamins and thus become suppliers not only of nitrogenous food, but a good source of essential vitamins and it is with these last two groups that my present invention is concerned.

It is not necessary to go into detailed theories regarding the nutriments necessary for the growth of yeast. Suffice it to say that the yeast requires for its growth carbon, oxygen, nitrogen, hydrogen and a small amount of inorganic elements mainly consisting of phosphorus, potassium, magnesium, calcium, silica, sodium, etc. All these elements are essential for the growth of yeast and must be supplied artificially via a nutrient medium or wort. As sources of carbon the assimilable sugars of molasses or of mashed cereal grains are employed, and as sources of nitrogen and other inorganic constituents, organic or inorganic ammonia salts and other inorganic salts containing the necessary elements are employed in the nutrient solution.

In spite of all this no clear knowledge exists to show how yeast assimilates carbon, hydrogen and oxygen. Regarding the assimilation of nitrogen, however, there seems to be a clearer knowledge. The formation of amino acids from organic or inorganic nitrogenous material is a well established fact. It is assumed, however, that nitrogen assimilation requires very little energy in the yeast, which is mainly supplied by the oxidation of the carbonaceous sugar material. It is also well recognized that the common yeast is not able to assimilate elementary nitrogen from the atmosphere. The mechanism of oxidation to produce energy is fairly well understood and is generally expressed by the following formulae:

(1) 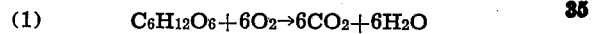

Reaction representing yeast growth.

(2) 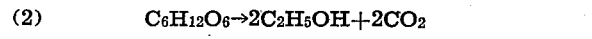

Fermentation by yeast to produce alcohol.

(3) 

Indication that aeration produces no alcohol and that all sugar goes to nutrition of yeast.

The above formulae show the mechanism of oxidation but throw very little light as to the carbon and oxygen assimilation by yeast from this material.

The question as to whether the yeast assimilates carbon, hydrogen and oxygen directly without fermentation or oxidation, or whether it assimilates the carbon, hydrogen and oxygen from some of the reaction products, or perhaps by some intermediate combination, has not been satisfactorily answered. The only thing known about this reaction is that in the presence of excess oxygen, in other words by aeration, greater direct oxidation takes place preferentially to yeast propagation. Expressed differently this knowledge shows that to produce alcohol one should not aerate, while in the production of yeasts one should aerate during the propagation. Aeration stimulates the re-production and growth of yeast while lack of it promotes the fermentative activity of yeast. In one case the yeast spends itself in extraneous work, while in the other it absorbs the extraneous materials to fatten itself and grow.

The present invention, as above noted, primarily relates to the second phase of the yeast activity namely that of fattening itself and growing.

I have found that an extremely small amount of an organic oxygen compound where at least a part of the oxygen is loosely combined and which oxygen is liberatable under high potential, acts as a catalyst in making the nutrient materials more assimilable by the yeast. I have found that yeast, contrary to all known facts and expectations, is able to assimilate elementary nitrogen from the air in the presence of these oxygen compounds. While this at the present time is not of practical commercial application as the yield of yeast is relatively smaller, the fact remains that atmospheric nitrogen in an elementary form is assimilated by the yeast. I have also found that the yeast grown in the presence of the special oxygen compounds have a greater vitamin content particularly of the oxidizing type.

The oxygen compounds found suitable for this purpose as catalysts in yeast propagation are of the type and structure of organic peroxides, peracids or salts thereof. Further requirements as indicated are that the peroxidic compounds must be non-toxic and their liberatable oxygen must have a potential at least 50 times higher than that of other oxygen-liberating compounds such as inorganic peroxides like hydrogen peroxide or calcium peroxide, or certain hypo-chlorides.

Yeast, as heretofore manufactured, has required for its growth an amount of oxygen which is in weight at least twice that of the sugar oxidized. The extraordinary fact has been observed that for catalyzing the nutrient solutions in accordance with the process of the present invention, not more than $\frac{1}{10000}$ of a part of oxygen as liberated from these peroxidic compounds, is all that is required. This means that the ratio of oxygen supplied by these peroxidic compounds to that required for growth is not less than ten thousand. The peroxidic compounds that have been found useful in this work are primarily those produced from food residues such as for instance, compounds produced from fatty acids, individual or mixed, amino acids or poly-hydroxy compounds like sugars. While it is undoubtedly true that some organic peroxidic compounds may be toxic, it is also true that a very large class of such peroxidic compounds is not at all toxic to yeast. It is therefore to be understood that while in the specific embodiment of the invention compounds of food residues are used, the invention in its broader aspects includes all suitable organic, peroxidic compounds which are non-toxic to the yeast and which liberate their oxygen at a potential higher than fifty times that of inorganic oxygen-liberating compounds. Examples of suitable compounds are the fatty acid peroxides described in my prior joint patent with William B. Stoddard, No. 1,718,609, issued June 25, 1929.

It is also to be understood that the invention broadly considered is not limited to any nutrient solutions or to any species of yeast propagation nor to any specific conditions of pressure, temperature, aeration, etc., although in the specific example, specific conditions and specific nutrient solutions will be used for illustrative purposes.

There are two methods of carrying out the preferred embodiment of the invention:

(1) Where the peroxidic compound is used as a contact material in vats where the yeast is grown, and (2) Where the peroxidic compound is incorporated with yeast or where the yeast is treated by the peroxidic compound.

*Example I*

The vat wherein the yeast is to be propagated is coated with a thin layer of an organic peroxidic compound made from fatty acids as for instance one made from the total acids of cocoa butter or from substantially pure stearic acid. In order to protect this thin layer the vat should be preferably spongy in character and not smooth. In this coated vat a nutrient solution is introduced. A typical nutrient solution may be made by dissolving in 7000 parts of tap water about 100 parts of sugar or an equivalent sugar-containing material such as molasses, 6 parts of ammonium sulphate, 2 parts of ammonium di-phosphate, 4 parts of potassium sulphate, 2 parts of gypsum, 2 parts of magnesium sulphate. Ten to twenty pounds of seed yeast is introduced into this nutrient solution. The solution is vigorously aerated at a temperature of between 26° and 30° C. for about twelve hours. Generally speaking at the end of about seven to ten hours the yeast growth is completed and during the propagation of the yeast as the acidity of the nutrient solution increases, a part or most of it is fractionally or gradually neutralized by anti-acid and yeast-nutrient materials such as aqueous ammonia solution, calcium carbonate, calcium or magnesium phosphate, or bi-carbonate of soda, etc. The nutrient solution, however, should never be allowed to remain too acidic, and the pH should never be lower than 3. Yeast yields as high as 300% based on the amount of sugar consumed from the nutrient solution, have been obtained by this process. This, however, depends on the concentration and the type of nutrient solution and conditions of temperature and aeration used. Compared with the control yeast under identical nutrient, concentration, temperature and aeration conditions, but without the presence of the peroxidic material, 25 to 50% higher yields are obtained by my process.

After the process is completed, that is, some time after eight to twelve hours, the yeast is separated, washed and compressed in the usual manner as known to prior art.

Instead of coating the vat in this example a special false-bottomed container that is porous and which is impregnated with a peroxidic compound, may be used in the vat. The aeration might take place through the false bottom of this vessel. It is important to see that a large surface of the peroxidic compound is exposed to the yeast and to bring this about various devices and methods may be used without departing from the spirit of the invention.

The cocoa butter peroxidic compound is lighter than water and tends to float on the surface without providing sufficient contact to the growing yeast in the presence of the nutrient medium. For this reason various devices such as coating the vat or impregnating a false-bottom vessel, or perhaps impregnating a cloth bag that can be held to the vessel, are necessary. The material should never be allowed to float on the surface. A coated vessel or an impregnated false-bottom vessel can be used over and over again for many times without losing the efficiency because only an extremely small amount of this catalyst, in the order of one part to every ten thousand parts of oxygen required, is exhausted.

*Example II*

The seed yeast is treated with this cocoa butter peroxidic compound preferably mixed in some sugar medium such as glucose. The peroxidic compound necessary for such treatment is between 1% and 2% of the weight of the yeast treated. During this treatment which is brought about by intimately admixing the seed yeast and the peroxidic compound and sugar mixture and letting it stand for a short length of time at the incubation temperature, the yeast becomes liquid. This liquid, but not autolyzed, seed yeast, after this treatment, is introduced into the nutrient solution, in a vat. The propagation is continued for seven to twelve hours with vigorous aeration after which time the yeast is collected, washed and compressed. By this method also irrespective of the conditions and concentration of nutrient solutions, the yeast yield is higher by 25% to 50%.

As an alternative method the peroxidic compound may be dispersed in the nutrient solution by the use of proper emulsifying and peptizing agents, and the seed yeast propagated in such emulsified nutrient solutions. The yeast produced according to this invention, depending upon the species of the seed yeast, has, of course, different characteristics. But in every case I have observed that the characteristics of the yeast product are far more desirable than those of products produced by prior art methods.

Speaking of the bakers' yeast product as produced by the present invention, the yeast has greater viability, greater resistance, less odor and color; greater content of nitrogen and greater vitamin value.

I claim:

1. A process of producing yeast in a standard nutrient solution which includes vigorously aerating and effecting catalysis during yeast growth by bringing the seed yeast in intimate contact with an oxygen liberating organic peroxidic compound that liberates its oxygen at a potential at least 50 times greater than that of hydrogen peroxide.

2. A process of producing yeast in a standard nutrient solution which includes the step during yeast growth of bringing the seed yeast in intimate contact with between 1% and 2% of an oxygen liberating organic peroxidic compound, that liberates its oxygen at a potential at least 50 times greater than that of hydrogen peroxide.

3. A process of producing yeast in a standard nutrient solution which includes the step of effecting catalysis during yeast growth by bringing seed yeast in intimate contact with not more than 1% to 2% of a fatty acid peroxidic compound that liberates its oxygen at a potential at least 50 times greater than that of hydrogen peroxide.

4. A process of producing yeast in a standard nutrient solution which includes the step of effecting catalysis during yeast growth by bringing the seed yeast in intimate contact with not more than 1% to 2% of cocoa butter peroxidic compound.

VAMAN R. KOKATNUR.